(12) United States Patent
Sweitzer et al.

(10) Patent No.: US 12,458,370 B2
(45) Date of Patent: Nov. 4, 2025

(54) TREPHINE

(71) Applicant: Shukla Medical, St. Petersburg, FL (US)

(72) Inventors: Zachary Robert Sweitzer, Keyport, NJ (US); Brian Joseph Servedio, St. Petersburg, FL (US); Adam Gosik-Wolfe, Tampa, FL (US)

(73) Assignee: Shukla Medical, St. Petersburg, FL (US)

( * ) Notice: Subject to any disclaimer, the term of this patent is extended or adjusted under 35 U.S.C. 154(b) by 280 days.

(21) Appl. No.: 17/723,818

(22) Filed: Apr. 19, 2022

(65) Prior Publication Data

US 2023/0329726 A1 Oct. 19, 2023

(51) Int. Cl.
*A61B 17/16* (2006.01)
*A61B 17/00* (2006.01)

(52) U.S. Cl.
CPC ..... *A61B 17/1637* (2013.01); *A61B 2017/00477* (2013.01)

(58) Field of Classification Search
CPC ................................................ A61B 17/1637
See application file for complete search history.

(56) References Cited

U.S. PATENT DOCUMENTS

| | | | | |
|---|---|---|---|---|
| 2,969,122 A * | 1/1961 | Steffes | ................... | B23B 51/04 |
| | | | | 175/426 |
| 4,818,157 A * | 4/1989 | Kouvelis | ............. | B25D 17/005 |
| | | | | 81/125 |
| 8,414,585 B2 * | 4/2013 | Meneghini | ......... | A61B 17/1637 |
| | | | | 606/86 R |
| 9,757,135 B1 | 9/2017 | Kelley | | |
| 2002/0099382 A1 * | 7/2002 | Salazar | .................. | A61B 50/30 |
| | | | | 606/86 R |
| 2006/0106363 A1 | 5/2006 | Aravena et al. | | |
| 2007/0123909 A1 * | 5/2007 | Rupp | ..................... | A61B 17/92 |
| | | | | 606/104 |
| 2010/0094361 A1 * | 4/2010 | Meneghini | ......... | A61B 17/1637 |
| | | | | 606/86 R |
| 2012/0271357 A1 * | 10/2012 | Arthur | ............... | A61B 17/1617 |
| | | | | 606/279 |

(Continued)

FOREIGN PATENT DOCUMENTS

CN 201030448 Y * 3/2008
CN 103622727 A 3/2014

(Continued)

OTHER PUBLICATIONS

International Search Report in International Patent Application No. PCT/US2023/065522, mailed Jun. 27, 2023.

(Continued)

*Primary Examiner* — Zade Coley
(74) *Attorney, Agent, or Firm* — Kim IP Law Group LLC (57) ABSTRACT

A trephine is provided. The trephine includes a hole saw sized to accommodate an implant, the hole saw having: a cylindrical body having a proximal end, a distal end and an outer surface, a plurality of circumferentially spaced cutting teeth at the distal end of the cylindrical body, and a plurality of helical grooves on the outer surface of the cylindrical body; and a quick connect coupled to the proximal end of the cylindrical body for releasably connecting to a cooperating quick connector of a tool.

12 Claims, 11 Drawing Sheets

(56) References Cited

U.S. PATENT DOCUMENTS

| | | | |
|---|---|---|---|
| 2015/0132710 A1* | 5/2015 | Nouriam | A61C 1/084 |
| | | | 433/75 |
| 2017/0143351 A1* | 5/2017 | Devitre | A61C 8/0087 |
| 2020/0038045 A1 | 2/2020 | Gladstone | |
| 2020/0405495 A1* | 12/2020 | Gatrell | A61B 17/1684 |

FOREIGN PATENT DOCUMENTS

| | | | | |
|---|---|---|---|---|
| EP | 2712571 A1 * | 4/2014 | | A61B 17/1615 |
| WO | WO-2011036655 A1 * | 3/2011 | | A61C 8/0018 |
| WO | 2018152529 A1 | 8/2018 | | |
| WO | WO-2020210442 A1 * | 10/2020 | | A61B 17/1615 |
| WO | WO-2022055348 A1 * | 3/2022 | | |

OTHER PUBLICATIONS

Written Opinion in International Patent Application No. PCT/US2023/065522, mailed Jun. 27, 2023.

WIPO, International Preliminary Report on Patentability in counterpart International Application No. PCT/US2023/065522, issued on Oct. 8, 2024.

IP Australia, Examination Report issued in related Australian Application No. 2023255601, dated Jun. 23, 2025.

Japan Patent Office, Office Action issued in related Japanese Application No. 2024559945, dated Sep. 8, 2025.

\* cited by examiner

TREPHINE

BACKGROUND OF THE DISCLOSURE

The exemplary embodiments of the present invention relate generally to a trephine and, more specifically, to trephine for cutting away an interface around cylindrical implants implanted within a patient.

BRIEF SUMMARY OF THE DISCLOSURE

In accordance with an exemplary embodiment of the subject disclosure, a trephine is provided. The trephine includes a hole saw sized to accommodate an implant, the hole saw having: a cylindrical body having a proximal end, a distal end and an outer surface, a plurality of circumferentially spaced cutting teeth at the distal end of the cylindrical body, and a plurality of helical grooves on the outer surface of the cylindrical body; and a quick connect coupled to the proximal end of the cylindrical body for releasably connecting to a cooperating quick connector of a tool.

In accordance with an aspect of the subject disclosure, each of the plurality of cutting teeth extends radially outwardly beyond the outer surface of the cylindrical body.

In accordance with another aspect of the subject disclosure, the helical grooves have a depth, and each of the cutting teeth extends radially outwardly beyond the outer surface of the cylindrical body a distance approximately equal to the depth of the helical grooves.

In accordance with still another aspect of the subject disclosure, each of the plurality of cutting teeth has a curved blade.

In accordance with yet another aspect of the subject disclosure, the cylindrical body has an inside diameter of about 6 mm to 26 mm.

In accordance with still another aspect of the subject disclosure, the plurality of helical grooves comprises eight helical grooves.

In accordance with yet another aspect of the subject disclosure, the cylindrical body has a length of about 7 to 9 inches.

In accordance with still another aspect of the subject disclosure, the quick connect includes at least one flat surface for receiving a torquing force from a tool connected to the quick connect.

In accordance with yet another aspect of the subject disclosure, the quick connect includes at least one proximally facing plateau for receiving an axial force from a tool.

In accordance with still another aspect of the subject disclosure, each of the circumferentially spaced cutting teeth has a cutting edge having a width less than a width of an adjacent helical groove.

Other features and advantages of the subject disclosure will be apparent from the following more detailed description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

"Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the Figures, there is shown a trephine 100 in accordance with an exemplary embodiment of the subject disclosure. Trephine 100 comprises a hole saw 102 and a quick connect 120 at a proximal end of hole saw 102 for releasably connecting trephine 100 to a cooperating quick connector of a tool, such as tool extension 200 (see FIG. 10), e.g., a drill, handle, slide hammer, strike plate or other element.

Hole saw 102 includes an elongated shaft-like body 128 having a central longitudinal axis 152, a proximal end 106 coupled to quick connect 120, a distal end 104 provided with a plurality of cutting teeth 108, an outer surface 112 and a plurality of helical grooves 110 extending along outer surface 112. In accordance with one aspect of the subject disclosure, hole saw 102 has an overall length Li of about 8 inches but can alternatively be less than or greater than 8 inches, e.g., 4, 5, 6, 7, 9, 10, 11, 12 or more inches. In accordance with another aspect of the subject disclosure, hole saw 102 has an inside diameter $D_2$ of approximately 6 mm to 26 mm, including 7, 8, 9, 10, 11, 12, 13, 14, 15, 16, 17, 18, 19, 20, 21, 22, 23, 24, and 25 mm, but alternatively can be less than about 6 mm or greater than approximately 26 mm, e.g., +/−3, 4, 5, 27, 28, 29 mm. In accordance with another aspect of the subject disclosure, inside diameter $D_2$ is selected to accommodate a particular type or class of implant, including, e.g., rods, pins, nails and other implants having a substantially cylindrical shape.

Body 128 is preferably formed from a rigid and sterilizable material, such as, for example, a metal or sterilizable composite, though it should be appreciated that body 128 may be formed from any other suitable material(s). In the embodiment depicted in the Figures, body 128 forms a cylindrical member having a circular cross-section, though it should be appreciated that body 128 may have a different shape, length, and/or cross-section. It should also be appreciated that body 128 may be formed integrally as one piece (as shown in the Figures) or from a plurality of separate and connectable body segments.

In the embodiment depicted in the Figures, body 128 is provided with eight helical grooves 110, each positioned between two cutting teeth 108 and extending the entire length (or substantially the entire length) of body 128, though it should be appreciated that helical grooves 110 may extend across only a portion of body 128. It should also be appreciated that body 128 may be provided with more or fewer helical grooves 110, e.g., 4, 5, 6, 7, 9, 10, 11, 12 or more grooves and/or different or similar numbers of helical grooves 110 and cutting teeth 108.

Figure 1:
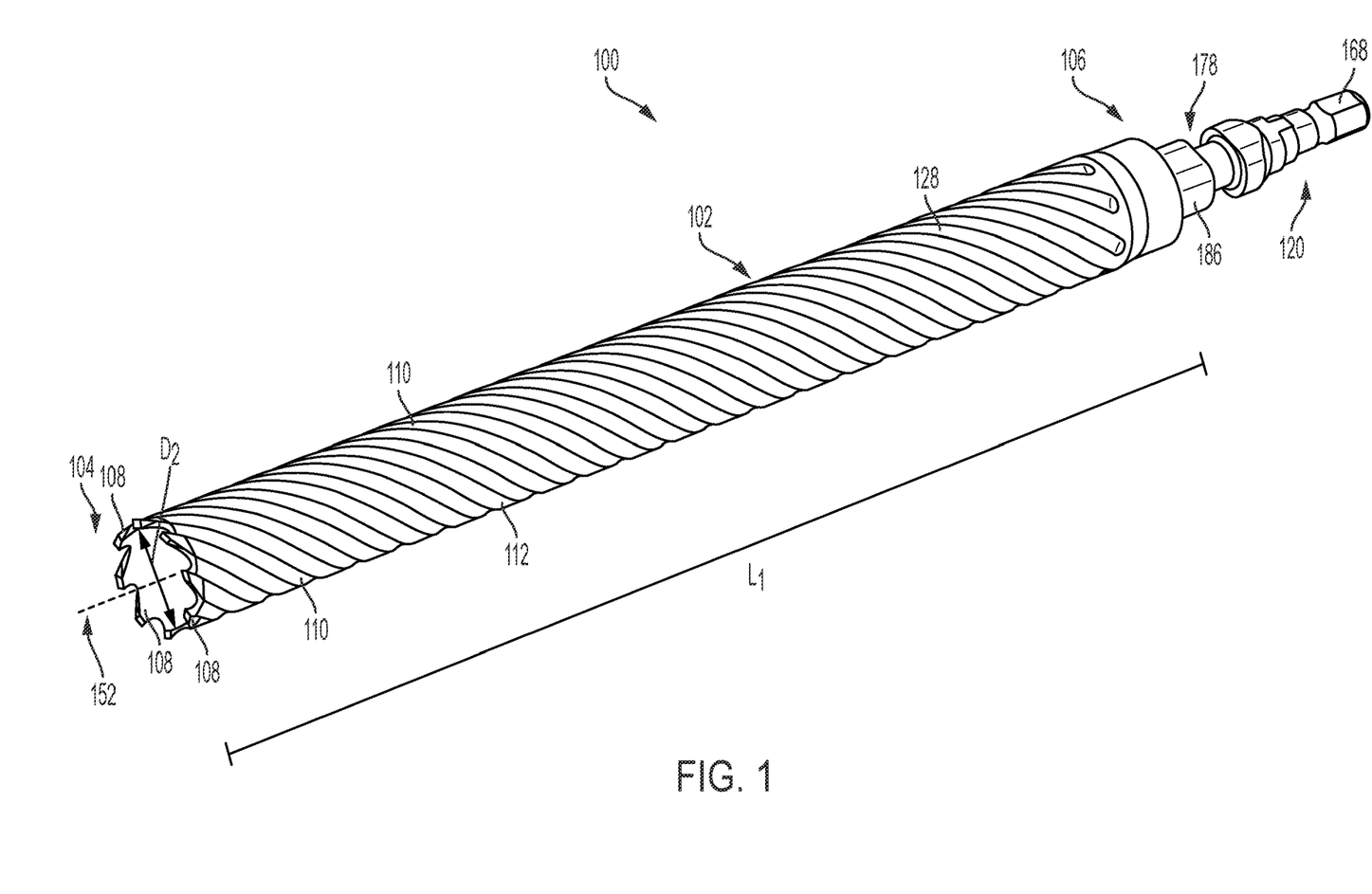
FIG. 1 is a perspective view of a trephine in accordance with an exemplary embodiment of the subject disclosure.
Figure 2:
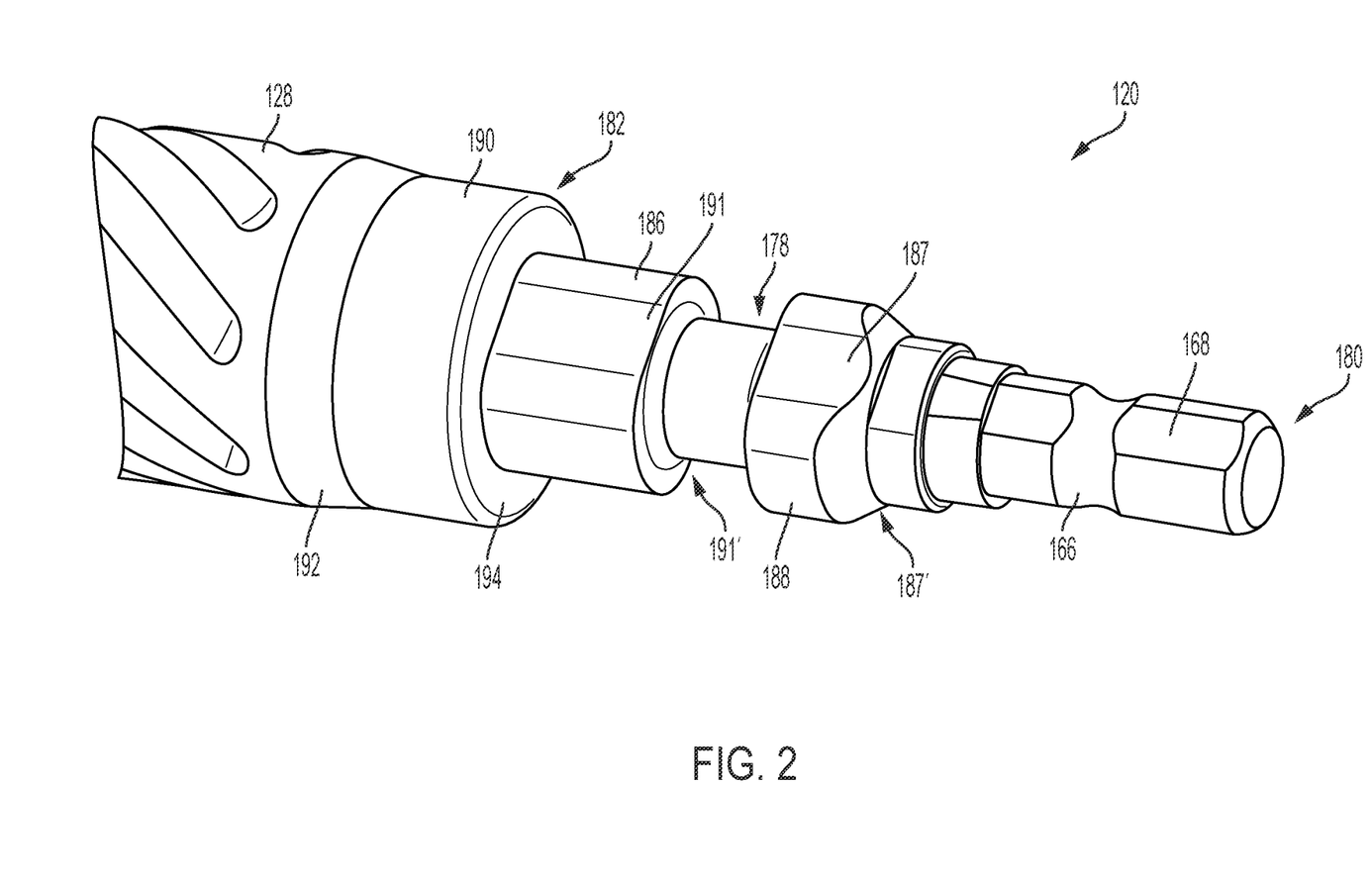
FIG. 2 is a partial perspective view of a proximal end of the trephine of FIG. 1.
Figure 3:
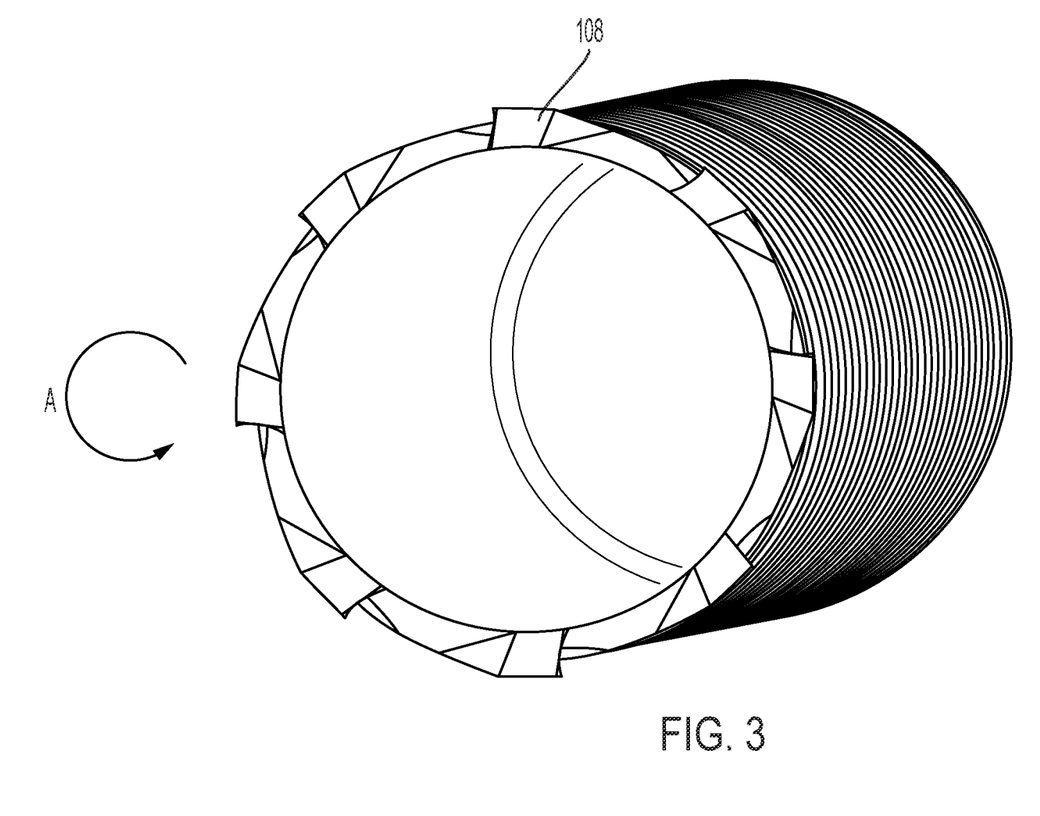
FIG. 3 is another perspective view of a distal end of the trephine of FIG. 1.
Figure 4:
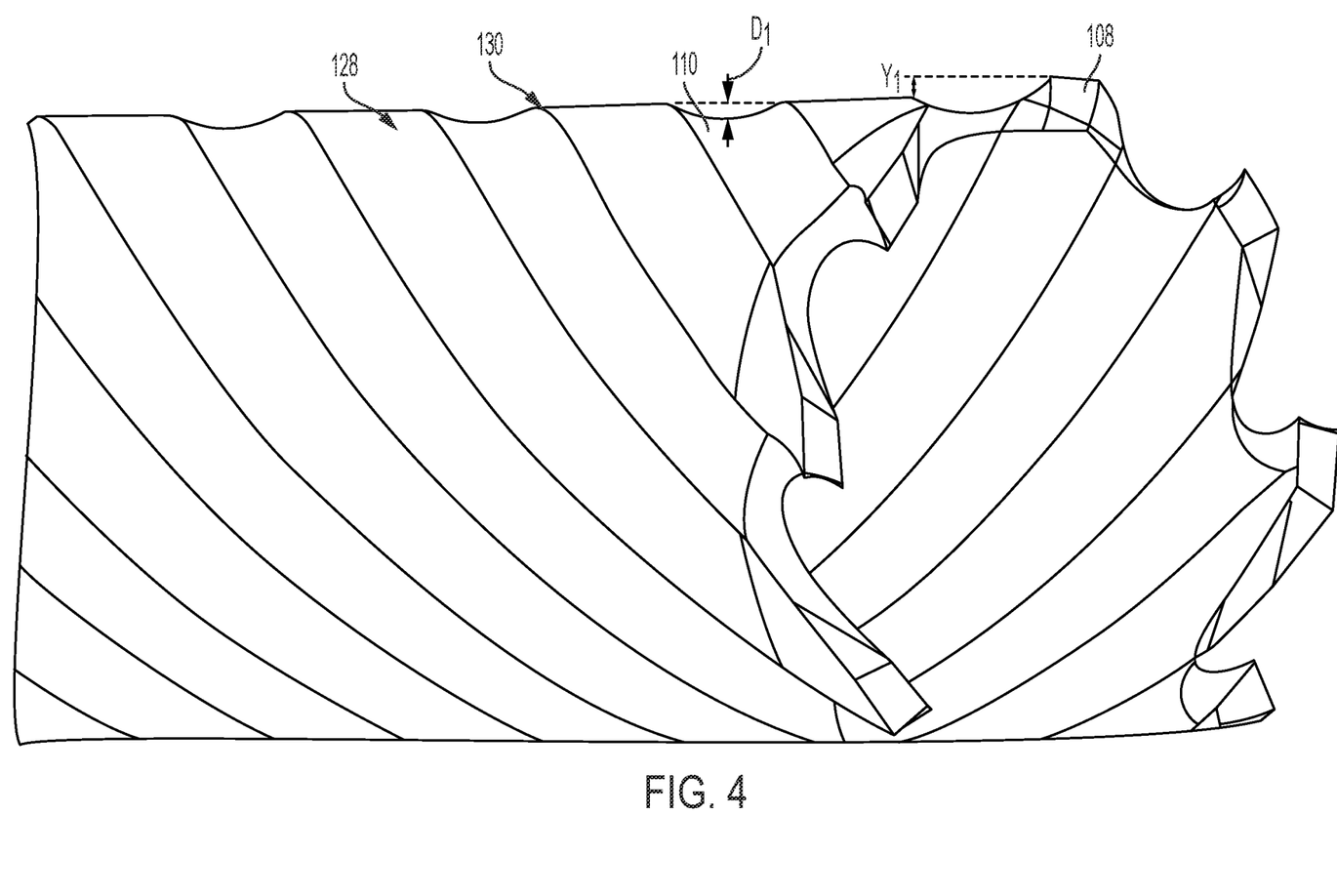
FIG. 4 is another partial perspective view of a distal end of the trephine of FIG. 1.
Figure 5:
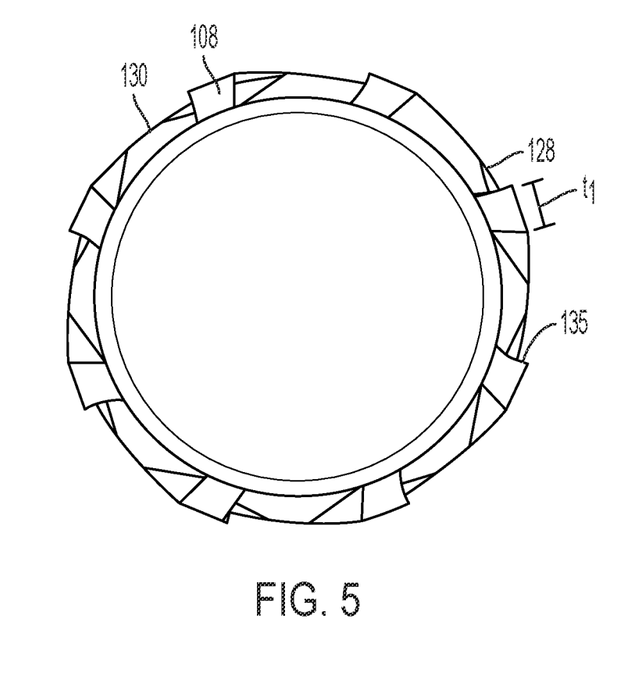
FIG. 5 is a distally facing view of the trephine of FIG. 1.
Figure 6:
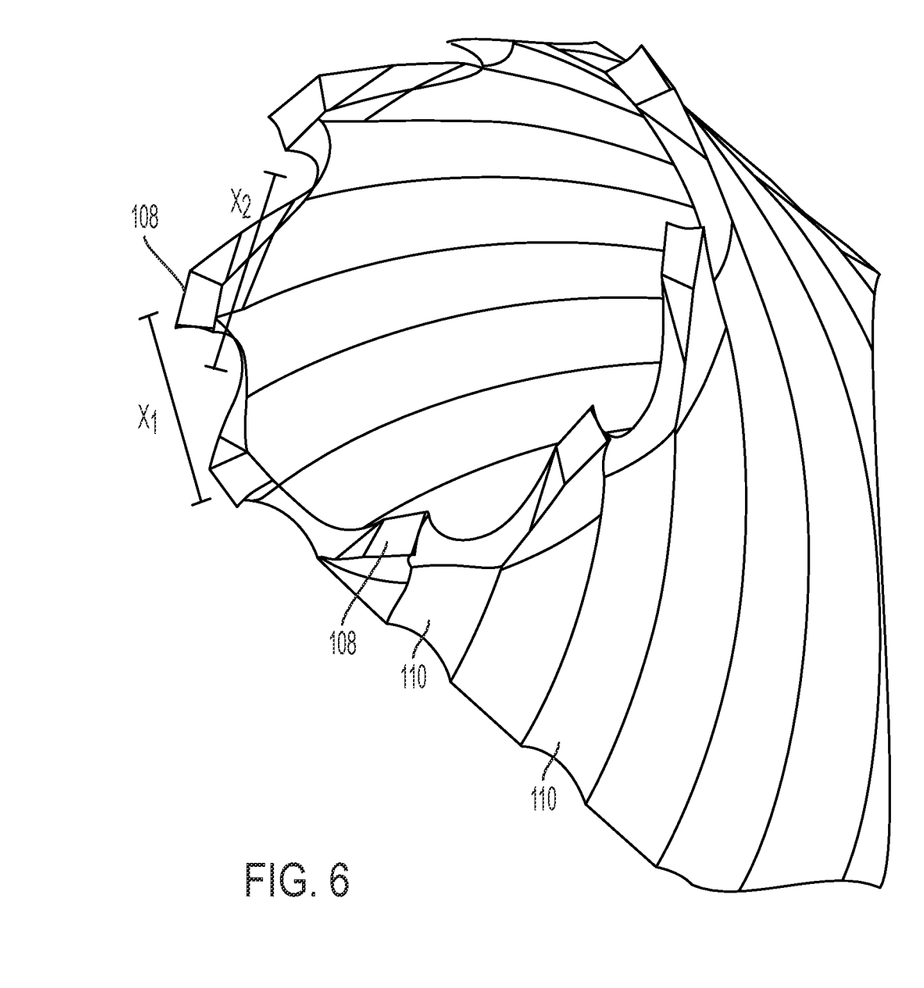
FIG. 6 is another partial perspective view of the trephine of FIG. 1.
Figure 7:
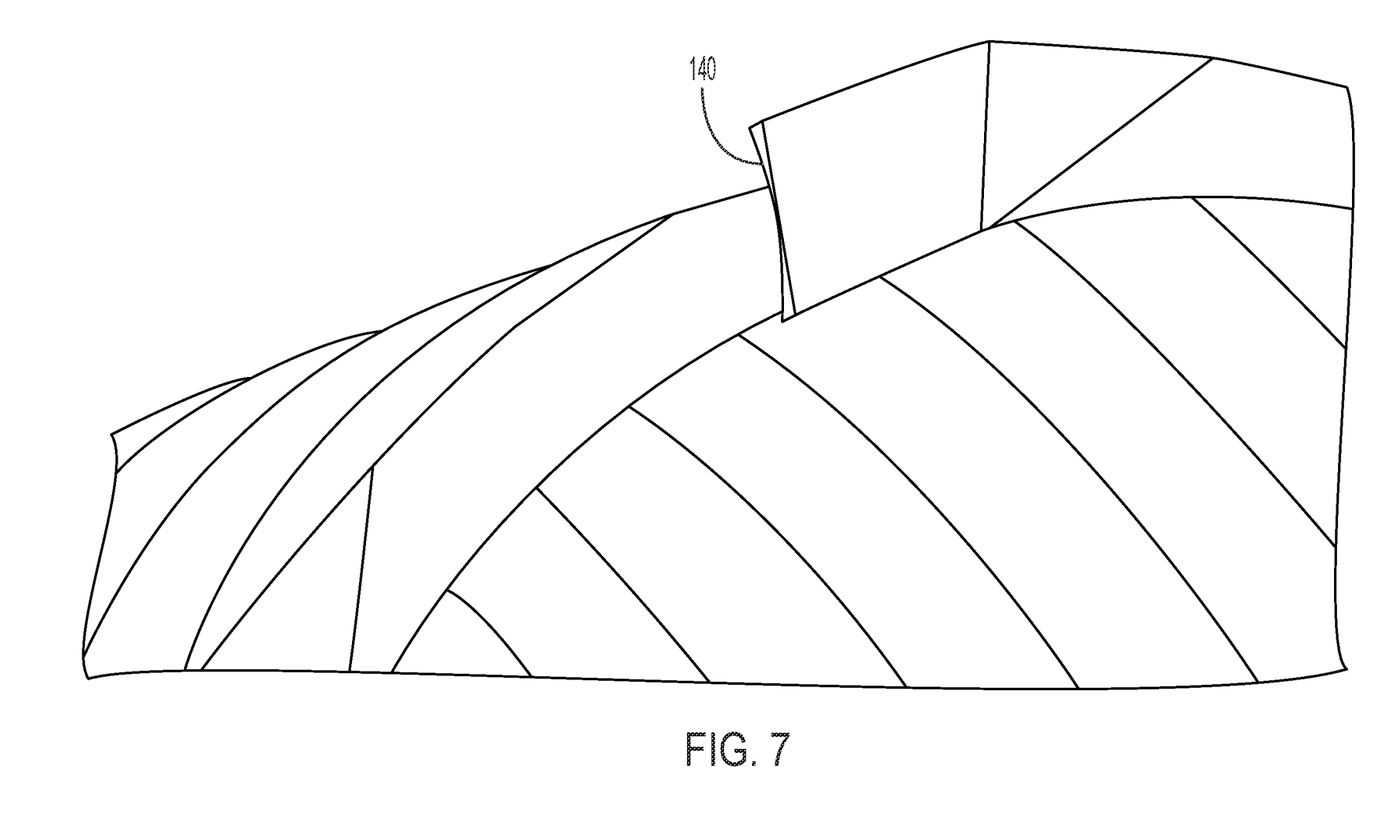
FIG. 7 is an enlarged partial perspective view of the trephine of FIG. 1.
Figure 8:
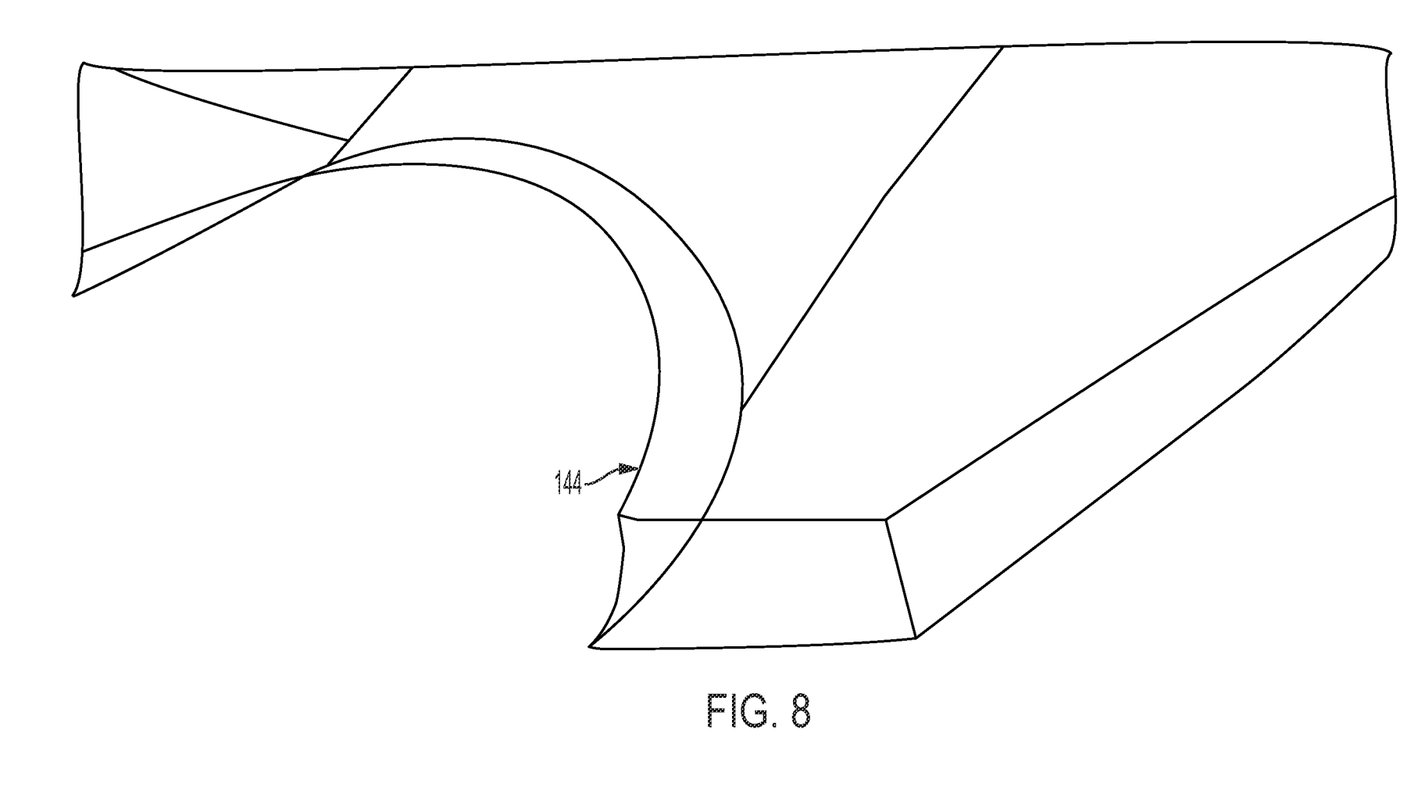
FIG. 8 is an enlarged partial perspective view of a cutting tooth of a hole saw of the trephine of FIG. 1.
Figure 9:
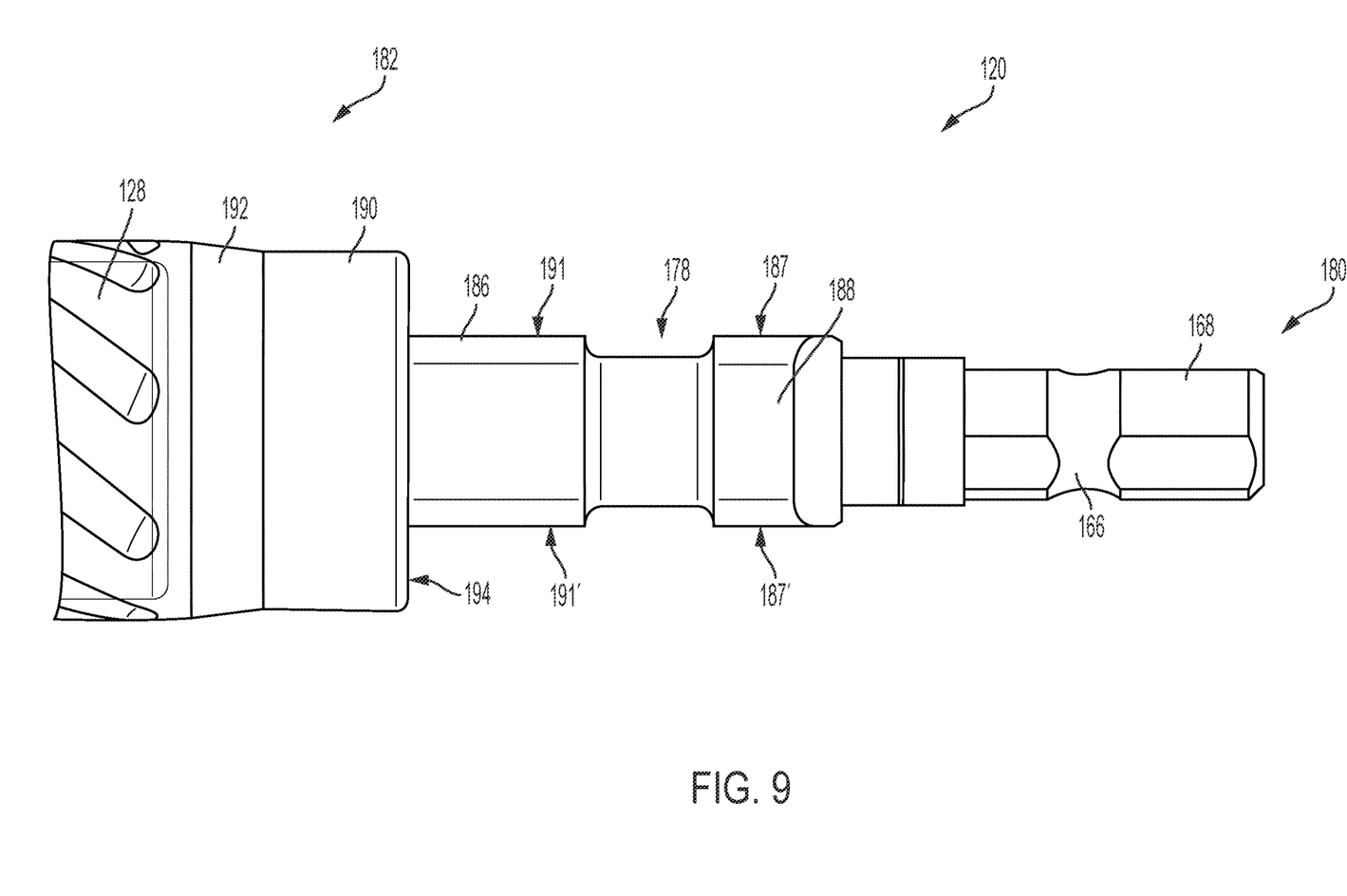
FIG. 9 is a partial side view of a quick connect of the trephine of FIG. 1.

Each of cutting teeth 108 is configured to cut through bone, bone cement, and/or soft tissue surrounding an implant when trephine 100 is rotated in a direction indicated by arrow A (see FIG. 3). As best shown in FIGS. 3-8, cutting teeth 108 are circumferentially spaced apart a distance $X_1$ about distal end 104 of body 128 and extend therefrom distally. Cutting teeth 108 also curve radially outwardly a distance $Y_1$ beyond outer surface 112 of body 128 (see FIG. 4). In the embodiment depicted in the Figures, distance $Y_1$ is approximately equal to a depth $D_1$ of helical grooves 110, though it should be appreciated that distance $Y_1$ and depth $D_1$ may differ. For example, $Y_1$ and the distance cutting teeth 108 extend beyond outer surface 112 may be, e.g., 1.5×, 2.0× or 2.5× depth $D_1$.

Each of cutting teeth 108 includes a blade 140, a curved cutting face 144 having a rake angle of about 0 to 30 degrees, a notched or curved edge 135 to reduce chipping and a cutting length ti of about 0.035 to 0.04 inches. With respect to the embodiment depicted in FIGS. 1-10, each blade 140 is curved, though it should be appreciated that trephine 100 may be alternatively provided with a variety of other blades having different dimensions, shapes, curvatures, lengths and/or sizes, such as, for example, to accommodate various types of implants. For example, in one embodiment, each blade 140 is straight (not curved) and has a rake angle of about 0 degrees (see FIG. 11). Each blade 140 may also be provided with different thicknesses/widths and/or curve in distally and/or outwardly radial directions relative to longitudinal axis 152 of body 128. In one embodiment, each of cutting teeth 108 has a cutting edge having a width less than a width of an adjacent helical groove 110, though it should be appreciated that these features may be dimensioned differently.

As described above, quick connect 120 is structured to releasably couple to a tool, such as, for example, a drill, handle, slide hammer, strike plate or other element (not shown). In the embodiment depicted in the Figures, quick connect 120 includes a Hudson connector, though it should be appreciated that quick connect 120 may include other types of connectors.

Figure 10:
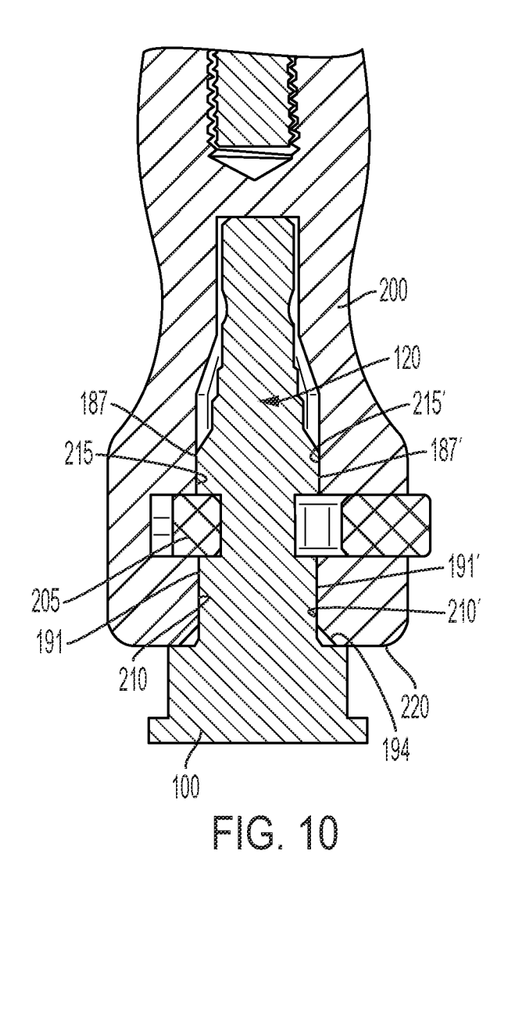
FIG. 10 is a partial cross-sectional view of the trephine of FIG. 1 coupled to a tool.
Figure 11:
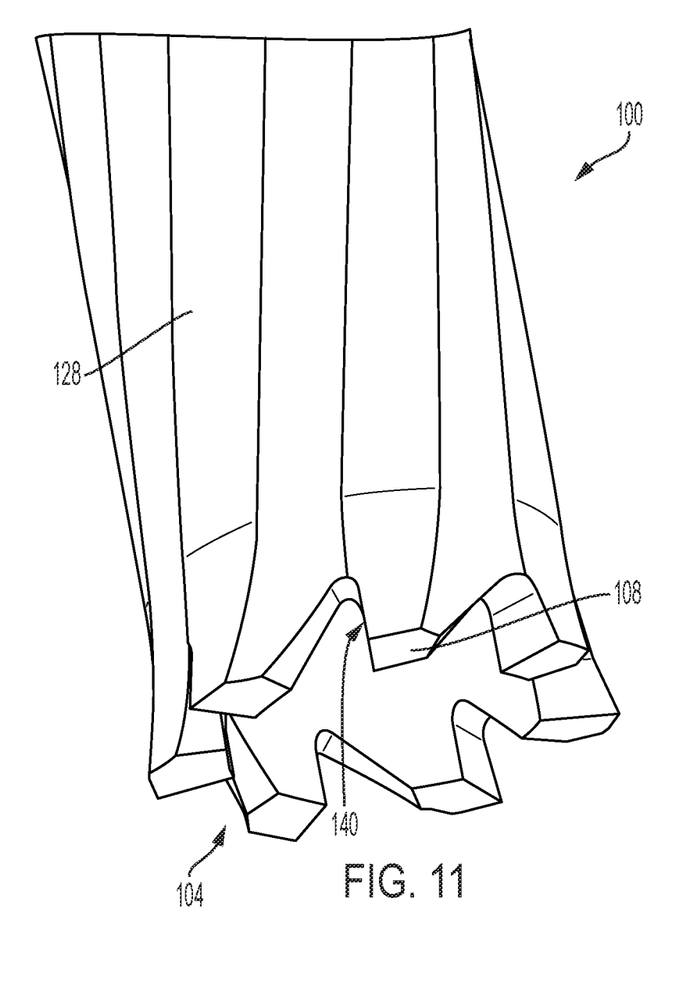
FIG. 11 is a perspective view of a distal end of a trephine in accordance with another embodiment of the subject disclosure.

As best shown in FIGS. 1, 2, 9 and 10, quick connect 120 includes a distal end 182 and a proximal end 180 provided with necked and hexagonal portions 166, 168 structured to properly position trephine 100 within a tool, such as tool extension 200 (see FIG. 10). Distal end 182 of quick connect 120 is provided with a circular-shaped mounting head 190 having a distally extending intermediate flange portion 192 and a proximally facing plateau 194, a first post 186 extending proximally from mounting head 190, a second post 188 proximal of and coaxial with first post 186, and an annular groove 178 positioned between first and second posts 186, 188 for engaging with a locking element 205 of a tool, such as tool extension 200. First and second posts 186, 188 are provided with respective pairs of opposed flats or flat surfaces 191, 191' and 187, 187' structured to engage with suitably positioned mating surfaces 210, 210' and 215, 215' of cooperating tools (such as tool extension 200) to permit tool extension 200 to impart a torquing force to trephine 100 when rotated. Proximally facing plateau 194 of mounting head 190 mates with a suitably positioned surface 220 of cooperating tool extensions (such as tool extension 200) to allow trephine 100 to receive a force applied axially to tool extension 200, such as when tool extension 200 is a slide hammer or strike plate.

Trephine 100 may be used to cut away an interface around an implant, such as, for example, a cylindrically shaped implant (not shown) implanted within a patient. To begin the operation, a tool suitable for applying a torquing force to trephine 100 (such as a T-handle or drill) is coupled to quick connect 120. Distal end 104 of body 128 is then positioned about the implant. A torquing force is then applied, e.g., by the drill to rotate cutting teeth 108 and their respective curved blades 140 to drive hole saw 102 of trephine 100 into the interface around the implant. As hole saw 102 is driven into the interface, fragments of bone, cement, and/or soft tissue removed by cutting teeth 108 are directed into and transported proximally away from the patient by helical grooves 110. Once the interface around the implant is fully cut away, trephine 100 may be removed from the patient.

If trephine 100 becomes stuck within the interface during the cutting operation, the drill may be reversed slightly and driven forward again to continue the operation. If reversal of the drill is not possible or ineffective, the drill may be removed and a T-handle, hammer or other suitable tool extension may be coupled to quick connect 120 to permit a surgeon or other user to manually apply a continuous or impacting torquing or linear force to trephine 100 to reverse hole saw 102 out of the interface, after which the drill may be reconnected to continue the cutting operation. Other tool extensions may be coupled to trephine 100 to assist in the loosening process. For example, a slide hammer or strike plate extension may be coupled to trephine 100 to permit a surgeon or other user to apply an axially directed impacting force to assist in loosening hole saw 102.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as disclosed above and defined by the claims.

We claim:

1. A trephine comprising:
a hole saw sized to accommodate an implant, the hole saw having:
a cylindrical body having a proximal end, a distal end and an outer surface,
a plurality of circumferentially spaced cutting teeth at the distal end of the cylindrical body, and
a plurality of helical grooves on the outer surface of the cylindrical body, wherein each of the plurality of helical grooves extends out through a distal end of the cylindrical body and has a constant concave cross-section throughout its entire length; and
a quick connect coupled to the proximal end of the cylindrical body for releasably connecting to a cooperating quick connector of a tool.

2. The trephine of claim 1, wherein each of the plurality of cutting teeth has a curved blade.

3. The trephine of claim 1, wherein the cylindrical body has an inside diameter of about 6 mm to 26 mm.

4. The trephine of claim 1, wherein the plurality of helical grooves comprises eight helical grooves.

5. The trephine of claim 1, wherein the cylindrical body has a length of about 7 to 9 inches.

6. The trephine of claim 1, wherein the quick connect includes at least one flat surface for receiving a torquing force from a tool connected to the quick connect.

7. The trephine of claim 1, wherein the quick connect includes at least one proximally facing plateau for receiving an axial force from a tool.

8. The trephine of claim 1, wherein each of the circumferentially spaced cutting teeth has a cutting edge having a width less than a width of an adjacent helical groove.

9. The trephine of claim 1, wherein the quick connect comprises:
a first post;
a second post proximal to the first post and having a tapered proximal surface;
an annular groove separating the first and second posts;
first and second spaced apart hexagonal portions proximal to the second post; and
a neck separating the first and second spaced apart hexagonal portions.

10. The trephine of claim 1, wherein each of the plurality of cutting teeth has a curved blade face.

11. The trephine of claim 1, wherein each of the cutting teeth extends radially outwardly beyond the outer surface of the cylindrical body a distance approximately 1.5 to 2.5 times the depth of the helical grooves.

12. A trephine comprising:
a hole saw sized to accommodate an implant, the hole saw having:
a cylindrical body having a proximal end, a distal end and an outer surface,
a plurality of circumferentially spaced cutting teeth at the distal end of the cylindrical body, and
a plurality of helical grooves on the outer surface of the cylindrical body, wherein each of the plurality of helical grooves has a constant concave curved cross-section throughout its entire length and extends out through a distal end of the cylindrical body; and
a quick connect coupled to the proximal end of the cylindrical body for releasably connecting to a cooperating quick connector of a tool, the quick connect including:
a proximally facing top most surface, and
at least one proximally facing plateau spaced from the proximally facing top most surface for receiving an axial force from a tool.

* * * * *